Nov. 28, 1933.  L. V. OLIVET  1,936,769
ANTIRATTLING HINGE
Filed May 6, 1932
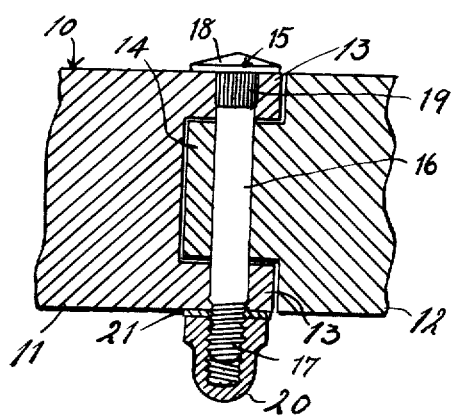
Fig. 1
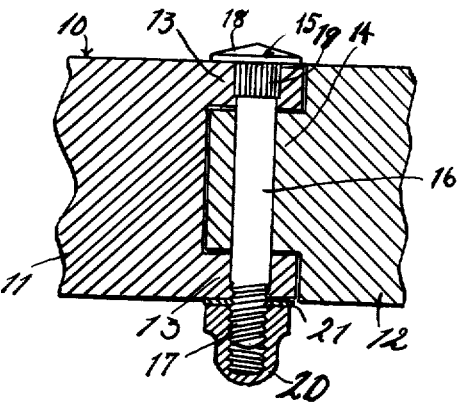
Fig. 2
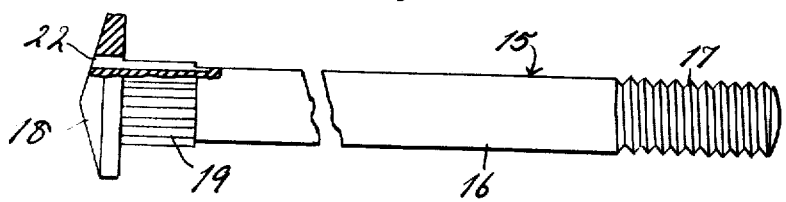
Fig. 3
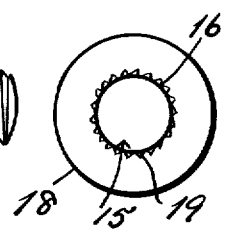
Fig. 4
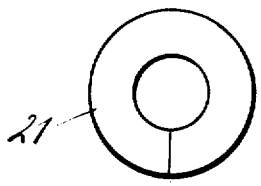
Fig. 5
Fig. 6
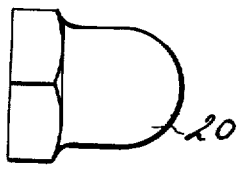
Fig. 7
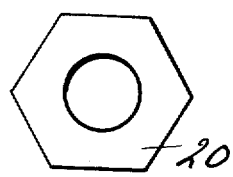
Fig. 8
INVENTOR
Louis V Olivet
By W W Williamson
Atty.

Patented Nov. 28, 1933

1,936,769

UNITED STATES PATENT OFFICE 1,936,769

ANTIRATTLING HINGE

Louis V. Olivet, Philadelphia, Pa.

Application May 6, 1932. Serial No. 609,637

1 Claim. (Cl. 16—169)

My invention relates to new and useful improvements in an anti-rattling hinge, especially adapted for use in the mounting of automobile doors and the like, and has for one of its objects to provide means for contracting the knuckles of the hinge leaves or parts of the knuckle of one of the hinge leaves whereby any lost motion between the knuckles of the companion hinge leaves will be taken up or eliminated.

Another object of the invention is to provide a hinge structure wherein the pintle is in the form of a bolt having a nut threaded thereon for contracting parts of a hinge leaf or the hinge leaves, or the knuckles, or parts thereof.

Another object of the invention is to provide a pintle of the kind described with means to prevent rotation thereof so that what I term the movable hinge leaf will be the only one to rotate on the pintle.

A further object of the invention is to provide the pintle with an oil duct whereby the bearing portion thereof and a knuckle or knuckles of the movable member may be readily lubricated.

A still further object of the invention is to provide as a new article of manufacture a hinge pintle comprising a body having a plain intermediate bearing portion, a threaded end for the reception of a nut, a head at the opposite end, and a knurled collar contiguous the head and between said head and the bearing portion.

Still another object of the invention is to provide as an article of manufacture a hinge pintle in the form of a bolt with the knurled collar contiguous the head and having an oil duct passing through the head and traversing the collar and entering the plain or bearing portion of the bolt and all of that part of the duct within the region of the collar and bearing portion of the bolt being open along the side of said bolt.

With these and other ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawing forming a part of this application, in which:—

Fig. 1 is a sectional view transversely of the leaves of a hinge with the pintle left in elevation to illustrate the details of construction of my invention and showing the hinge knuckles separated.

Fig. 2 is a similar view after the pintle has been adjusted to eliminate lost motion and resultant rattling.

Fig. 3 is an enlarged side elevation of the pintle per se with a portion of the head end broken away and shown in section to illustrate the arrangement of the oil duct.

Fig. 4 is an end view thereof looking at the threaded end.

Fig. 5 is a face view of a lock washer which is preferably used in connection with the invention.

Fig. 6 is an edge view thereof.

Fig. 7 is a side elevation of a nut for use in connection with the pintle.

Fig. 8 is an inner end view thereof.

In carrying out my invention as herein embodied, 10 represents a hinge comprising two leaves 11 and 12 and for purposes of description the former will be termed the stationary leaf and the latter the movable leaf, although it will be understood that said leaves are interchangeable or reversible.

The leaf 11 is provided with knuckles 13 between which fits the knuckle 14 of the leaf 12.

Ordinarily the pintle connecting these two leaves passes through the knuckles thereof and after the hinge has been used for a while the coacting end faces of said knuckles will wear away to some extent and likewise the walls of the leaves surrounding the holes through the knuckles as well as parts of the pintle will become worn permitting considerable "play" between the parts so that a hinged member, such as a door, will sag and in the case of vehicle doors, considerable rattling will occur as the vehicle passes over an uneven roadway.

The disadvantages outlined above are overcome by my invention since the knuckles or parts of knuckles of one of the hinge leaves will be contracted and drawn snugly against contiguous parts of the knuckle or knuckles of the companion hinge leaf so that there will be no movement of one hinge leaf relative to the other longitudinally of the pintle and the pintle will be held against movement and therefore all rattling will be eliminated.

To accomplish the above purposes I provide a pintle 15 in the form of a bolt having an intermediate bearing portion 16 and a threaded portion 17 at one end. On the other end of the bolt is formed a head 18 of any suitable or desirable shape, size or configuration and contiguous said head between said head and the bearing portion is formed a knurled collar 19 in the form of longitudinal corrugations, preferably producing by broaching, whereby said knurled collar will be of larger circumference than either the threaded or bearing portions of the pintle.

Said pintle is placed in the hinge so that the knurled collar will cut or embed itself in the walls of one of the knuckles of the leaf 11 whereby the pintle is held against rotation. It might be well to state at this time that the knurled collar must be of such length that it will not pass through the knuckle of the leaf 11 or in any way interfere with the operations of the leaf 12.

When the pintle is in place its threaded end will project beyond an edge of the hinge for the reception of the nut 20 which will bear against one of the knuckles of the leaf 11 opposite that knuckle engaged by the head so that said head and nut are in opposition to each other and when the nut is drawn home the leaf knuckles 13 will be contracted and forced into engagement with contiguous opposite ends of the knuckle 14 of the leaf 12 producing a condition similar to that illustrated in Fig. 2. While only small parts of the knuckles are shown in Fig. 2, to be in engagement with each other it will be obvious to those skilled in the art that after the hinge has been in use for a short time the surfaces will be worn down and the pintle may be tightened from time to time to take up any wear and finally cause the ends of the knuckles of the hinge leaves to coincide with one another.

While it does not seem to be absolutely necessary, I have found it advisable to interpose a washer 21, preferably of the locking type as herein illustrated, between the nut and contiguous hinge knuckle face in order to prevent or reduce to a minimum the likelihood of the nut being jarred loose when the device is used on a vehicle.

In actual practice I have found that even where the holes through the hinge knuckles have become so much worn that the bearing part of the pintle is considerably smaller than the hole through the hinge knuckle 14 and the hinge knuckles 13 are contracted against said hinge knuckle 14 all rattling is eliminated, and I have also found that since most if not all of the wear on the ends of the knuckles is between the lower knuckle 13 and the lower end of the knuckle 14 that most of the contracting action takes place in the knuckle 13 so that the hinged member or door is generally raised or returned to its normal position relative to the door frame.

After the knuckles of the hinge leaves have been snugly drawn together sufficient friction between the parts will be produced to prevent the swinging of the hinged member without the use of considerable outside force and in fact the parts can be tightened to such an extent that it will be practically impossible for a person of ordinary strength to even move the hinged member, although this is not desirable. The point is that the parts may be so tightened that the hinged member may be moved to any desired position where it will remain until again moved by some outside force. Where the invention is used in connection with a vehicle door, they may be opened and will remain in open positions until closed by the person using the same.

In order to permit easy lubrication of the hinge, especially the movable leaf and pintle, I provide an oil duct 22 by forming a hole through the head and into the bearing portion 16 of the pintle therefore traversing the knurled collar 19 and those portions of the hole 22 within the knurled collar 19 and the bearing portion 16 of the pintle are in fact a groove opening to the exterior of the pintle whereby lubricant entered into the oil duct will flow therethrough and be distributed between the bearing portion 16 and the hinge element fulcrumed thereon.

Of course I do not wish to be limited to the exact details of construction as herein shown, as these may be varied within the limits of the appended claim without departing from the spirit of my invention.

Having thus fully described my invention, what I claim as new and useful is:—

As an article of manufacture, a hinge pintle in the form of a bolt with a head at one end and a thread on the opposite end leaving an intermediate plain or smooth bearing portion, a knurled collar contiguous the head, said pintle having an opening formed through the head thereof across the collar and into the bearing portion of said pintle with those portions of the opening traversing the collar and entering the bearing part of the pintle being open at the side of said pintle.

LOUIS V. OLIVET.